United States Patent

[11] 3,614,674

[72] Inventor John Dan Hill, III
Dallas, Tex.
[21] Appl. No. 61,558
[22] Filed Aug. 6, 1970
[45] Patented Oct. 19, 1971
[73] Assignee Collins Radio Company
Dallas, Tex.

[54] FILTER APPARATUS
3 Claims, 2 Drawing Figs.

[52] U.S. Cl. .......... 333/20, 333/70 R
[51] Int. Cl. .......... H03h 7/04, H03k 5/01
[50] Field of Search .......... 333/20, 70, 73

[56] References Cited

UNITED STATES PATENTS 2,627,546 2/1953 Paine .......... 333/20 X
2,963,647 12/1960 Dean .......... 333/20 X

OTHER REFERENCES

" Analysis of Linear Systems" -Cheng; Addison Wesley Publishing Co., Reading, Mass. 1959; pages 166– 168 and 233

*Primary Examiner*—Herman Karl Saalbach
*Assistant Examiner*—Marvin Nussbaum
*Attorneys*—Robert J. Crawford and Bruce C. Lutz

ABSTRACT: A filter designed in accordance with Laplace Transform theory and then approximated to a realizable filter having an impulse response of one-half cycle of a cosine wave.

INVENTOR.
JOHN D. HILL
BY Bruce C Lutz
ATTORNEY

INVENTOR.
JOHN D. HILL
BY Bruce C Lutz
ATTORNEY

FILTER APPARATUS

THE INVENTION

The present invention pertains generally to filters and more specifically to a filter having a sine wave response to a rectangular waveform input signal having a one-half-cycle duration. The impulse response of such a filter is a one-half-cycle cosine waveform.

In the transmission of signals over long distances it has been found that there is excessive intersymbol interference even when nonreturn to zero. Data bit information signals are utilized. Even more intersymbol interference occurs when the data bits are of the return to zero type. It has accordingly been ascertained that for communications over long distances there is less intersymbol distortion when a sine wave is used which reverses in phase for a change in data significance. In other words a change from logic 1 to logic 0 or vice versa. However, for actual usage of data information most computing machines are designed to utilize logic 1's and logic 0's in the form of data pulses or the lack thereof. Thus, there must be a conversion from the data bits to the biphase sine wave information in the modulation section thereof. The transformation from biphase sine wave to square wave pulses is not particularly difficult as circuits necessary for this transformation have been in existence for some time. However, the transformation from rectangular data bits to biphase sine wave information is somewhat more difficult. To my knowledge there has been no single filter designed previously which will accomplish this transformation.

It is therefore an object of my invention to produce a filter which will provide biphase sine wave information from rectangular data pulse input signals.

Figure 1:
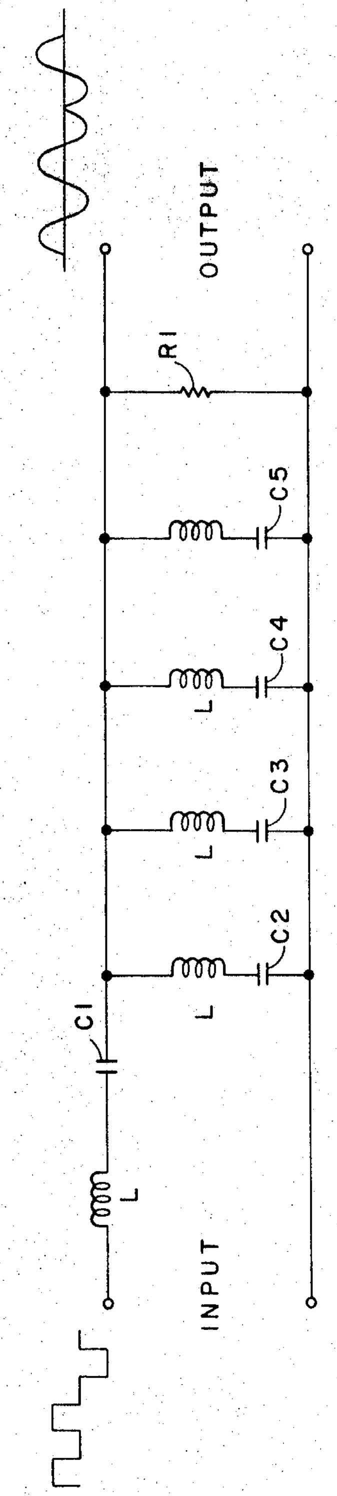
Figure 2:
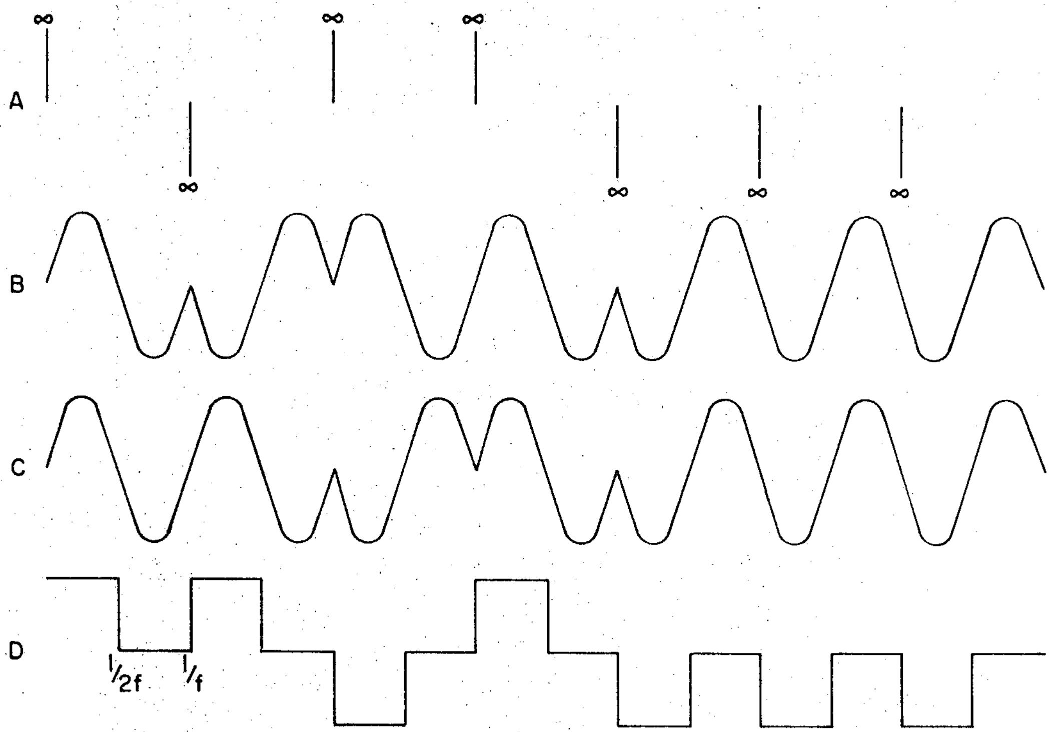

Other objects and advantages of the present invention may be ascertained from a reading of the specification and appended claims in conjunction with the drawings wherein:

FIG. 1 is a schematic diagram of one embodiment of a filter designed in accordance with the present invention; and FIG. 2 is a collection of waveforms utilized in explaining the invention.

As mentioned, FIG. 1 is a schematic diagram of a filter designed in accordance with the present invention. An explanation in visual lay terminologies is a practical impossibility. Therefore, the values of the various components of the embodiment of the filter shown in FIG. 1 are provided below with no further explanation of the transition of the signal as it passes therethrough from a one-half-cycle rectangular waveform pulse to a full-cycle sine wave signal.

| | | |
|---|---|---|
| All inductances | L =195.3 | nanohenries |
| | $C_1$=126.65 | picofarads |
| | $C_2$=14.072 | picofarads |
| | $C_3$=5.066 | picofarads |
| | $C_4$=2.584 | picofarads |
| | $C_5$=1.564 | picofarads |

In FIG. 2 a plurality of impulses are shown in waveform A and a plurality of biphase sine wave signals are shown in waveform 2B. As is well known to those skilled in the art an impulse is defined as an infinite amplitude, zero time duration signal which is used in Laplace Transforms to theoretically describe the response of a filter. Waveform 2B is the response of a filter with the impulses of FIG. 2A applied to its input designed in accordance with the formula:

$$F(s)=\frac{\omega}{s^2+\omega^2}(1-e^{-s/f}) \qquad \text{Equation 1}$$

However, since an impulse is defined as having infinite amplitude and zero duration such a signal is for practical purposes impossible to produce. A much more practical signal would be a rectangular pulse. Such a pulse might be a half-cycle pulse equal to one-half the desired sine wave. Such a waveform is shown in FIG. 2D wherein the full cycle is defined as $1/f$. The Laplace Transform of such a time waveform is $$G(s)=\frac{1-e^{-s/2f}}{s} \qquad \text{Equation 2}$$

or $$=-\frac{(1-e^{-s/2f})}{s} \qquad \text{Equation 3}$$

for a negative pulse.

If we divide equation 2 into equation 1 we obtain equation 4 which may be transformed to equation 5

$$=\frac{\omega}{s^2+\omega^2}(1-e^{-s/f})\left(\frac{s}{1-e^{-s/2f}}\right) \qquad \text{Equation 4}$$

$$=\frac{\omega s}{s^2+\omega^2}[1+e^{-s/2f}] \qquad \text{Equation 5}$$

The impulse response of a filter designed in accordance with the Laplace Transform of equation 5 is one-half cycle of a cosine wave. However, of more importance is the fact that such a filter will produce a sine wave in response to the application of a one-half-period rectangular waveform pulse.

Another way of explaining why it was decided that equation 1 should be divided by equation 2 was to remove from the filter having the Laplace Transform of equation 1 the portion of the filter which produced the sine wave output signals necessary to produce a square wave output. Since this portion is removed from the filter which produces a sine wave upon the application of an impulse, the application of a one-half-cycle rectangular waveform square wave will produce a single cycle of a sine wave at the output.

The filter described by the Laplace Transform of equation 5 is, however, not practically realizable. Accordingly, equation 5 must be transformed to a more workable form. By normalizing equation 5 to one radian per second, the Laplace Transform of equation 6 is obtained.

$$F(s)=\frac{s}{s^2+1}(1+e^{-\pi s}) \qquad \text{Equation 6}$$

The hyperbolic tangent of an angle is provided by equation 7.

$$\tanh\left(\frac{\pi s}{2}\right)=\frac{1-e^{-\pi s}}{1+e^{-\pi s}} \qquad \text{Equation 7}$$

By adding one to each side, equation 8 is obtained.

$$1+\tanh\left(\frac{\pi s}{2}\right)=1+\frac{1-e^{-\pi s}}{1+e^{-\pi s}} \qquad \text{Equation 8}$$

In obtaining a common denominator for the right side of the equation of equation 8 , equations 9 and 10 are obtained.

$$=\frac{1-e^{-\pi s}}{1+e^{-\pi s}}+\frac{1-e^{-\pi s}}{1+e^{-\pi s}} \qquad \text{Equation 9}$$

$$1+\tanh\left(\frac{\pi s}{2}\right)=\frac{2}{1+e^{-\pi s}} \qquad \text{Equation 10}$$

Equation 10 may now be inverted to produce equation 11 which has also been multiplied by 2 on both sides after inversion.

$$\frac{2}{1+\tanh\left(\frac{\pi s}{2}\right)}=(1+e^{-\pi s}) \qquad \text{Equation 11}$$

It will now be noted from equation 12 that we have a portion of original equation 6. If we now substitute the left-hand portion of equation 11 into the corresponding portion of equation 6; we obtain equation 12

$$F(s)=\frac{s}{s^2+1}\left[\frac{2}{1+\tanh\left(\frac{\pi s}{2}\right)}\right] \qquad \text{Equation 12}$$

Mittag-Leffler in a book titled "Theory and Problems of Complex Variables" authored by Murray R. Spiegel and published in 1964 by Schaum Publishing Co., pages 175, 191, and 192 provides the theory for expanding a hyperbolic function. Using the Mittag-Leffler's expansion theorem of equation 13, we can express the infinite sum thereof by equation 14.

Equation 13

$$\tan h(z)=2z\left(\frac{1}{z^2+\left(\frac{\pi}{2}\right)^2}+\frac{1}{z^2+\left(\frac{3\pi}{2}\right)^2}+\frac{1}{z^2+z^2+\left(\frac{5\pi}{2}\right)^2}+\cdots\right)$$

Equation 14

$$\tan h(z)=2z\sum_{1}^{\infty}\left[\frac{1}{z^2+\left(\frac{\pi}{2}\right)^2(2n-1)^2}\right]$$

If we now let $z$ in equation 14 equal $\pi s/2$, the argument of tank in equation 12, we obtain the following equations 15 and 16; wherein equation is a simplified version of equation 15.

Equation 15

$$\tan h\left(\frac{\pi s}{2}\right)=2\left(\frac{\pi s}{2}\right)\sum_{1}^{\infty}\left[\frac{1}{\frac{\pi^2 s^2}{4}+\frac{\pi^2}{4}(2n-1)^2}\right]$$

$$=\pi s\left(\frac{4}{\pi 2}\right)\sum_{1}^{\infty}\left[\frac{1}{s^2+(2n-1)^2}\right]$$

Equation 16

$$=\frac{4}{\pi}s\sum_{1}^{\infty}\left[\frac{1}{s^2+(2n-1)^2}\right]$$

We may now substitute equation 16 for tanh ($\pi s/2$) in equation 12 to obtain equation 17.

Equation 17

$$F(s)=\frac{s}{s^2+1}\left[\frac{2}{1+\frac{4}{\pi}s\sum_{1}^{\infty}\frac{1}{s^2+(2n-1)^2}}\right]$$

The reason for all of the foregoing manipulation is that the $s^2+1$ term in the denominator produced poles on the $j\omega$ axis of the S plane. The S plane is a complex frequency plane whose axes are the $\sigma$ or real axis and $j\omega$ or the imaginary axis. Such a filter is impossible to produce by present techniques. The reason for this being that as far as is known such a unit would be unstable and would oscillate. We can now manipulate the function of equation 17 to simplify the arithmetic and obtain equation 19.

Equation 18

$$F(s)=\frac{2s}{s^2+1}\left[\frac{\prod_{1}^{\infty}[(s^2+(2n-1)^2]}{\prod_{1}^{\infty}[s^2+(2n-1)^2]+\frac{4}{\pi}s\prod_{1}^{\infty}[s^2+(2n-1)^2]\sum_{1}^{\infty}\frac{1}{s^2+(2n-1)^2}}\right]$$

If the derivative of the first term of the denominator is taken we obtain the results of equation 19.

Equation 19

$$\frac{d}{ds}\prod_{1}^{\infty}[s^2+(2n-1)^2]$$

$$=2s\prod_{1}^{\infty}[s^2+(2n-1)^2]\sum_{1}^{\infty}\frac{1}{s^2+(2n-1)^2}$$

We find, however, that the derivative of the first term is contained in the second term of the denominator and therefore equation 18 can now be written as equation 20.

Equation 20

$$F(s)=\frac{2s}{s^2+1}\left[\frac{\prod_{1}^{\infty}[s^2+(2n-1)^2]}{\prod_{1}^{\infty}[s^2+(2n-1)^2]+\frac{2}{\pi}\frac{d}{ds}\prod_{1}^{\infty}[s^2+(2n-1)^2]}\right]$$

By inspection of equation 19 it will be determined that upon expansion of the term within the brackets of equation 1 the first term in the numerator will be $s^2+1$. The second term will be $s^2+9$, etc. However, the first term is of interest since this will cancel with the $s^2+1$ term outside the brackets of equation 20 to eliminate the problem producing poles on the $j\omega$ axis of the S plane.

The procedures outlined in "Introduction to Modern Network Synthesis" by VanValkenburg published by Wiley Publishing Company and copyrighted in 1960 will result in a practical realization of the filter described by equation 20. The materials in Chapters 3, 5, 8, 13, and 14 provide the detail necessary to design a filter from the Laplace Transform. The filter of FIG. 1 is the result of a 10-pole approximation as provided by equation 21 by evaluating the expression for $n=1$ to 5.

Equation 21

$$F(s)=\frac{2s}{s^2+1}\left[\frac{(s^2+1)(s^2+9)(s^2+25)(s^2+49)(s^2+81)}{s^{10}+165s^8+8778s^6+172810s^4+1057221s^2+893025+\frac{2}{\pi}\frac{d}{ds}(s^{10}+165s^8+8778s^6+172810s^4+1057221s^2+893025)}\right]$$

$$=2\left[\frac{s(s^2+9)(s^2+25)(s^2+49)(s^2+81)}{s^{10}+\frac{20}{\pi}s^9+165s^8+\frac{2640}{\pi}s^7+8778s^6+\frac{105336}{\pi}s^5+172810s^4+\frac{1382480}{\pi}s^3+1057221s^2+\frac{4228884}{\pi}s+893025}\right]$$

$$=2\left[\frac{s(s^2+9)(s^2+25)(s^2+49)(s^2+81)}{s^{10}+6.3661976s^9+165s^8+840.33808s^7+8778s^6+33529.490s^5+172810s^4+440057.04s^3+1057221s^2+1346124.2s+893025}\right]$$

Since the computations involved in solving equations 20 and 21 are extensive, the normal, practical way of obtaining the filter design information is to program a computer to obtain the filter design parameters.

While a particular embodiment of a filter has been disclosed in the present application, the invention comprises the broad idea of using a desired time response, Laplace Transforms and approximation to produce a practical filter and more specifically is related to a filter which will produce biphase data from rectangular waveform input signals. Transformation techniques are well known to those skilled in the art to produce filters which have the same impulse response as the filter shown in FIG. 1 but have a different physical implementation. Examples would be transformer or lattice networks.

I therefore wish to be limited not by the disclosure but only by the scope of the appended claims wherein:

I claim:

1. The method of designing a filter substantially in accordance with that represented by the idealized Laplace Transform to $F(s)=s(1+e^{-s/2f})\left(\frac{\omega}{s^2+\omega^2}\right)$ comprising the steps of:

normalizing $\omega$ to one radian per second;

transposing terms and expanding to obtain the Laplace Transform $$F(s)=\frac{s}{s^2+1}\left[\frac{2}{1+\frac{4}{\pi}s\sum_{1}^{\infty}\frac{1}{s^2+(2n-1)^2}}\right]$$

approximating the last referenced Laplace Transform for a value of $n$ which is at least equal to one to remove the poles from the $j\omega$ axis of the S plane; and programming a computer to solve the second Laplace Transform.

2. The method of altering a half-cycle rectangular pulse to a single-cycle sine wave comprising the steps of:

passing the rectangular waveform signal through a filter constructed in accordance with a finite number of terms of the Laplace Transform $$F(s)=\frac{s}{s^2+1}\left[\frac{2}{1+\frac{4}{\pi}s\sum_{1}^{\infty}\frac{1}{s^2+(2n-1)^2}}\right]$$

3. Apparatus of the class described comprising in combination:

means for supplying an input signal having a waveform which is rectangular and one-half cycle of a given frequency in duration;

output means; and filter means connected between said input means and said output means for altering said rectangular waveform input signals to a single cycle of a sine wave, said filter means being constructed in accordance with the Laplace Transform:

$$F(s)=\frac{s}{s^2+1}\left[\frac{2}{1+\frac{4}{\pi}s\sum_{1}^{\infty}\frac{1}{s^2+(2n-1)^2}}\right]$$